(12) United States Patent
Reddy et al.

(10) Patent No.: US 6,171,624 B1
(45) Date of Patent: Jan. 9, 2001

(54) WATER-IN-OIL SPREAD WITH WATER BASE FRUIT COMPOSITION

(75) Inventors: Podutoori Ravinder Reddy, Columbia, MD (US); Thomas John Wajda, Jr., Florida, NY (US); Michael Charles Cirigliano, Cresskill, NJ (US); Andreas Markus Keller, Ridgefield, NJ (US)

(73) Assignee: Lipton, Division of Conopco, Inc., Englewood Cliffs, NJ (US)

( * ) Notice: Under 35 U.S.C. 154(b), the term of this patent shall be extended for 0 days.

(21) Appl. No.: 09/298,415

(22) Filed: Apr. 23, 1999

(51) Int. Cl.[7] .................. A23D 7/04; A23L 1/06
(52) U.S. Cl. .................. 426/249; 426/602; 426/603; 426/604; 426/615; 426/633
(58) Field of Search .................. 426/249, 603, 426/604, 615, 633, 602

(56) References Cited

U.S. PATENT DOCUMENTS

| | | | |
|---|---|---|---|
| H1395 | * 1/1995 | Prosser | 426/633 |
| 2,459,431 | * 1/1949 | Johnson | 426/615 |
| 3,117,871 | * 1/1964 | Bahr | 426/249 |
| 3,278,314 | 10/1966 | Colby et al. . | |
| 3,552,980 | * 1/1971 | Cooper | 426/249 |
| 3,582,358 | * 6/1971 | Bundus | 426/633 |
| 3,615,591 | * 10/1971 | Newlen | 426/633 |
| 3,969,514 | 7/1976 | Tiemstra . | |
| 4,103,051 | 7/1978 | Bodor et al. . | |
| 4,140,808 | * 2/1979 | Jovson | 426/585 |
| 4,238,520 | 12/1980 | Miller et al. . | |
| 4,273,790 | 6/1981 | Bosco et al. . | |
| 4,279,941 | 7/1981 | Bosco et al. . | |
| 4,425,371 | 1/1984 | Stratmann et al. . | |
| 4,500,553 | * 2/1985 | Liggett | 426/249 |
| 4,533,561 | 8/1985 | Ward . | |
| 4,562,085 | 12/1985 | Ruggiero . | |
| 4,649,057 | 3/1987 | Thomson . | |
| 4,835,000 | 5/1989 | Kehoe . | |
| 4,837,042 | * 6/1989 | Vajda | 426/615 |
| 4,847,098 | 7/1989 | Langler . | |
| 4,853,236 | 8/1989 | Langler . | |
| 4,865,867 | 9/1989 | Platt et al. . | |
| 4,873,104 | 10/1989 | Butcher et al. . | |
| 4,917,915 | 4/1990 | Cain et al. . | |
| 4,943,444 | * 7/1990 | Nozaki | 426/615 |
| 5,034,242 | 7/1991 | Lasdon et al. . | |
| 5,075,124 | 12/1991 | Horie et al. . | |
| 5,133,985 | 7/1992 | Seigler et al. . | |
| 5,143,742 | 9/1992 | Maroudas . | |
| 5,160,759 | 11/1992 | Nomura et al. . | |
| 5,169,668 | 12/1992 | Milio et al. . | |
| 5,217,742 | * 6/1993 | Jones | 426/603 |
| 5,240,734 | * 8/1993 | Izzo | 426/633 |
| 5,260,083 | 11/1993 | Brain et al. . | |
| 5,270,071 | 12/1993 | Sharp et al. . | |
| 5,302,408 | 4/1994 | Cain et al. . | |
| 5,308,639 | 5/1994 | Fung . | |
| 5,338,563 | 8/1994 | Mikulka et al. . | |
| 5,340,600 | 8/1994 | Reckweg et al. . | |
| 5,374,445 | 12/1994 | Havenstein et al. . | |
| 5,397,588 | 3/1995 | Anetnucci et al. . | |
| 5,409,727 | 4/1995 | Tholl . | |
| 5,451,420 | 9/1995 | Brain et al. . | |
| 5,503,863 | * 4/1996 | Brain | 426/615 |
| 5,518,752 | 5/1996 | Ito et al. . | |
| 5,567,454 | * 10/1996 | Bogdan | 426/633 |
| 5,656,322 | 8/1997 | Livingston et al. . | |
| 5,688,548 | * 11/1997 | Gaither | 426/615 |
| 5,783,247 | 7/1998 | Van der Heijden et al. . | |
| 5,837,307 | 11/1998 | Bodor et al. . | |
| 5,849,350 | * 12/1998 | Ashourian | 426/615 |
| 5,888,575 | 3/1999 | Lansbergen et al. . | |
| 5,958,503 | * 9/1999 | Dumoulen | 426/615 |

FOREIGN PATENT DOCUMENTS

| | | | |
|---|---|---|---|
| 50797/96 | * 4/1996 | (AU) | 426/90 |
| 1486634 | * 9/1977 | (GB) | 426/90 |
| 1583351 | * 1/1981 | (GB) | 426/90 |
| 58-152455 | * 9/1983 | (JP) | 426/633 |
| 59-316777 | * 2/1984 | (JP) | 426/90 |
| 61-100174 | * 5/1986 | (JP) | 426/90 |

OTHER PUBLICATIONS

The American Heritage Dictionary 1982 Hoeyhton Mifflen Co. Boston MA p. 1338.*
Banwort 1981 Basic Food Microbiology AVI Publishing Co. Inc. Wesptport CT, p. 82.*
Food Hydrocolloids, Vo. 1, 2 and 3, CRC Press Incorporated, Boca Raton FL. (1982 and 1983).
Colloid and interface Science, by J.C. van Enden et al., 140 (1990), pp. 105–113.
Fette, Seifein, Anstrichmitel, vol. 80, pp. 180–186 (1978).

* cited by examiner

*Primary Examiner*—Carolyn Paden
(74) *Attorney, Agent, or Firm*—Edward A. Squillante, Jr.

(57) ABSTRACT

A heterogeneous edible spread having a water-in-oil composition and a varigate composition is disclosed. The water-in-oil composition and the varigate composition have humectant concentrations that result in each of the compositions having substantially the same water activity, resulting in a spread having superior appearance, taste and texture.

30 Claims, No Drawings

WATER-IN-OIL SPREAD WITH WATER BASE FRUIT COMPOSITION

FIELD OF THE INVENTION

This invention is directed to an edible spread comprising a water base sugar composition. More particularly, the invention is directed to a heterogeneous edible spread comprising a water-in-oil composition having a water soluble humectant and a varigate composition having a water soluble humectant whereby the former and the later comprise substantially the same water activity.

BACKGROUND OF THE INVENTION

It is often recommended that individuals reduce their intake of fats, particularly saturated fats, in order to remain fit and in good health. Moreover, the reduction of overall caloric intake is of dietary interest in order to prevent obesity, diabetes, heart disease and the like.

Food manufacturers, in response to health and weight concerns of consumers, have attempted to reduce the fat content and calories of various food products, particularly spreads. Such reduced fat and calorie products, unfortunately, are not only difficult to formulate but generally inferior in appearance, taste and texture when compared to conventional high fat and calorie products. Moreover, in order to enhance flavor in nonfat, low-fat and high-fat containing spreads, food manufacturers have combined spices, like cinnamon, with the various products they prepare. The products having enhanced flavoring additives, unfortunately, often have an inferior appearance due to phase separation, bleeding or leaching of the various components combined to enhance the flavor of the spread.

It is of increasing interest to prepare a heterogeneous edible spread that has superior appearance, taste and texture. This invention, therefore, is directed to a heterogeneous edible spread comprising a water-in-oil composition having a water soluble humectant and a varigate composition having a water soluble humectant whereby the former and the latter comprise substantially the same water activity, and preferably, substantially the same flavor, and unexpectedly result in a heterogeneous edible spread with superior appearance, taste, and texture.

BACKGROUND REFERENCES

Efforts have been disclosed for making spreads. In U.S. Pat. No. 5,837,307, a process for making low fat spreads is described, and the process entails a cold mixing procedure wherein a pre-gelled aqueous phase is mixed with an emulsion of fat.

Other attempts have been made for preparing spreads. In U.S. Pat. No. 5,888,575, margarine spreads comprising saturated triglycerides are described.

Still further, efforts have been made for preparing flavoring compositions for spreads. In U.S. Pat. No. 5,783,247, flavoring compositions suitable as a butter flavor block are disclosed.

SUMMARY OF THE INVENTION

In a first embodiment, this invention is directed to a heterogeneous edible spread comprising:
(a) a water-in-oil composition comprising a water soluble humectant; and
(b) a varigate composition comprising a water soluble humectant.

In a second embodiment, this invention is directed to a heterogeneous edible spread comprising:
(a) a water-in-oil composition comprising a water soluble humectant;
(b) a varigate composition comprising a water soluble humectant; and
(c) an emulsifier composition comprising at least one member elected from the group consisting of a monoglyceride and a diglyceride, and optionally a polyglycerol ester of a fatty acid.

In a third embodiment, this invention is directed to a heterogeneous edible spread comprising:
(a) a water-in-oil composition comprising a water soluble humectant; and
(b) a varigate composition comprising a water soluble humectant wherein:
   (i) the water-in-oil composition and the varigate composition have substantially the same water activity; and
   (ii) the water-in-oil composition and the varigate composition each independently and optionally comprise a flavor that may or may not be substantially similar.

In a fourth embodiment, this invention is directed to a hetergeneous edible spread comprising:
(a) a water-in-oil composition comprising a water soluble humectant;
(b) a varigate composition comprising a water soluble humectant; and
(c) an emulsifier composition comprising at least one member elected from the group consisting of a monoglyceride and a diglyceride, and optionally a polyglycerol ester of a fatty acid wherein:
   (i) the water-in-oil composition and the varigate composition have substantially the same water activity; and
   (ii) the water-in-oil composition and the varigate composition each independently and optionally comprise a flavor that may or may not be substantially similar.

In a fifth embodiment, this invention is directed to a food product comprising at least one of the spreads defined by the first four embodiments of this invention.

DETAILED DESCRIPTION OF THE PREFERRED EMBODIMENTS

There generally is no limitation with respect to the type of water-in-oil composition which may be used in the heterogeneous edible spread of this invention other than that the water-in-oil composition can comprise a water soluble humectant and result in a heterogeneous spread that is desirable for human consumption and capable of comprising a varigate composition comprising a water soluble humectant. However, the preferred water-in-oil composition is one which is prepared from a fat phase and an aqueous phase wherein the fat phase comprises a triglyceride and the aqueous phase comprises a water soluble humectant.

The triglycerides which are employed in the fat phase that is used to make up the water-in-oil composition of this invention may be naturally occurring and derived from vegetable sources, animal sources, or both. In addition to naturally occurring triglycerides, it is within the scope of this invention to use triglycerides that have been modified either chemically, physically or genetically, or by any techniques which include a combination thereof.

The vegetable derived triglycerides which may be used in this invention include those which may be selected from the group consisting of soybean oil, sunflower oil, palm oil, palm kernel oil, high and low erucic rapeseed oil, coconut oil, olive oil, sesame oil, peanut oil, corn oil, linseed oil, cotton seed oil, shea and mixtures thereof.

The animal derived triglycerides which may be used in this invention include those which may be selected from the group consisting of fish oil, tallow oil, sardine oil, dairy fat and mixtures thereof.

Since the triglycerides which may be used in this invention may be modified, again, by chemical, physical or genetic means, triglycerides that are hydrogenated, fractionated and/or interesterified may be used in this invention. A more detailed description of the modified triglycerides which may be used in this invention may be found in U.S. Pat. No. 4,425,371, the disclosure of which is incorporated herein by reference.

It is also within the scope of this invention to employ natural and synthetic triglyceride replacements in the fat phase used to prepare the water-in-oil composition of this invention. Triglyceride replacements include, for example, compounds which may be classified as waxes, like jojoba oil, fatty acid esters, and mono- or disaccharides.

In a preferred embodiment, the triglyceride which makes up the fat phase used to prepare the water-in-oil composition of this invention is a triglyceride derived from a vegetable source that is a physically, chemically or unmodified liquid triglyceride, or a mixture thereof. It is further noted herein that the total amount of triglyceride present in the water-in-oil composition of this invention can comprise, consist essentially of, or consist of triglyceride that is derived from a vegetable source. The water-in-oil composition used to make the heterogeneous edible spread of this invention typically comprises about 1.0% to about 75%, and preferably, from about 15% to about 50%, and most preferably, from about 30% to about 40% triglyceride based on total weight of the heterogeneous edible spread, including all ranges subsumed therein. The preferred triglyceride used in this invention is soybean oil. In a most preferred embodiment, the triglyceride used in this invention is a mixture of triglycerides comprising partially hydrogenated oil and liquid oil wherein the former is oil that melts at about 25° C. to about 50° C. and the latter is oil that is a liquid at ambient temperature. The ratio of partially hydrogenated oil to liquid oil is limited only to the extent that the resulting fat phase may be used to prepare a water-in-oil composition that can be used to make a heterogeneous edible spread. Often, however, no more than about 35%, and preferably, no more than about 30%, and most preferably, no more than about 25% by weight of the total weight of the mixture of triglycerides in the fat phase used to prepare the water-in-oil composition of this invention is partially hydrogenated oil.

In addition to triglycerides, the fat phase used to prepare the water-in-oil composition of this invention may further comprise additional additives which include flavors (in addition to its own naturally occurring flavor), colorants, vitamins, anti-oxidants, antimicrobials, protein sources, thickening agents, chelating agents, preservatives, pH buffers, fruit puree, and preferably, phospholipids, like lecithin. When lecithin, for example, is the additive of choice, it typically makes up from about 0.01% to about 1.0%, and preferably, from about 0.05% to about 0.5%, and most preferably, from about 0.075% to 0.20% by weight of the total weight of heterogeneous edible spread, including all ranges subsumed therein.

The aqueous phase comprising the water soluble humectant that is combined with the fat phase to prepare the water-in-oil composition comprising the water soluble humectant used in this invention typically comprises from about 10% to about 40%, and preferably, from about 15% to about 35%, and most preferably, from about 20% to about 30% water based on total weight of the heterogeneous edible spread, including all ranges subsumed therein. In addition to water, the aqueous phase used to prepare the water-in-oil composition of this invention may further comprise additional additives including flavors (in addition to its own naturally occurring flavor), colorants, vitamins, anti-oxidants, antimicrobials, protein sources, thickening agents, chelating agents, preservatives, pH buffers as well as fruit puree. The preferred additive used in the aqueous phase is a water soluble humectant. An illustrated list of the water soluble humectants which may be used in the aqueous phase used to make the water-in-oil composition of this invention includes salt, sugar, sorbital, glycerol and mixtures thereof.

When salt is used, for example, in the aqueous phase that is combined with the fat phase to produce the water-in-oil composition of this invention, salt is added to taste and generally makes up from about 0.25% to about 4.0%, and preferably, from about 0.5% to about 3.0%, and most preferably, from about 0.75% to about 1.5% by weight of the total weight of the heterogeneous edible spread, including all ranges subsumed therein.

The preferred water soluble humectant which is used in the aqueous phase that is combined with the fat phase to produce the water-in-oil composition comprising a water soluble humectant used to prepare the heterogeneous edible spread of this invention is sugar. Sugar may be added to the aqueous phase in the granular and/or raw form. However, sugar is preferably added to the aqueous phase in the form of a syrup, like a commercially available syrup having about 30% by weight water, and about 70% by weight solids based on total weight of the syrup. Often, the preferred syrup which may be employed in this invention is corn syrup having about 55% to about 65% of its total solid content in the form of a saccharide such as fructose. When the preferred syrup is used, it typically makes up from about 10% to about 40%, and preferably, from about 15% to about 35%, and most preferably, from about 20% to about 30% by weight of the total weight of the heterogeneous edible spread, including all ranges subsumed therein.

It is especially noted herein that there is generally no limitation with respect to the type or amount of water soluble humectant used in this invention (as long as a heterogeneous edible spread can be made), and the amounts and types of water soluble humectant may be selected according to taste. It is preferred in this invention, however, that the type and total amount of water soluble humectant in the water-in-oil composition of this invention is such that the water-in-oil composition has substantially the same water activity as the varigate composition. (Water activity is defined to mean the ratio of the partial pressure of water above a sample being measured and the vapor pressure of pure water at the same temperature. When the water activity is substantially the same, this indicates that there is no water migration between aqueous phases).

When a protein source is, for example, added to the aqueous phase that is combined with the fat phase to produce the water-in-oil composition used in this invention, the amount of protein source (as calculated in powder form) which is added is typically in the range of from about 0.25% to about 5.0%, and preferably, form about 0.5% to about 3.0%, and most preferably, from about 0.75% to about 2.0% protein source based on total weight of the heterogeneous edible spread, including all ranges subsumed therein. There is generally no limitation with respect to the type of protein source added to the aqueous phase of this invention other than that the protein source is capable of being used in a heterogeneous edible spread. An illustrative list of the protein sources which may be used in this invention include dairy protein like whole milk, semi-skimmed milk, skimmed milk, cultured buttermilk, buttermilk powder, skimmed milk powder, yogurt, yogurt powder, quark, cottage cheese, whey powder, butter, mixtures thereof and the like, with yogurt powder being the most preferred. An illustrative list of the non-dairy proteins which may be used in this invention include soy protein, rice protein, mixtures thereof and the like.

Thickening agents which may be used, for example, in the aqueous phase that is combined with the fat phase to produce the water-in-oil composition used in this invention are limited only to the extent that they increase the viscosity of the aqueous phase. Such thickening agents are generally classified as hydrocolloids and often selected from the group consisting of xantham gum, guar gum, cellulose gum, carrageenan gum, locust bean gum, alginate, viscosifying starches and mixtures thereof. Other thickening agents include gelling agents derived from plants, microorganisms and animals. An illustrative list of such agents includes carrageenan, pectin, gellan gum, agar, olginate, maltodextrin and starches. Still other thickening agents which may be used in this invention include those described in *Food Hydrocolloids*, Volumes 1, 2 and 3, CRC Press Incorporated, Boca Raton, Fla. 1982 and 1983, as edited by Martin Glicksman, the disclosure of which is incorporated herein by reference. The amount of thickening agents employed is limited only to the extent that the amount added will allow for the production of a heterogeneous edible spread when the aqueous phase and fat phase are combined and processed. Typically, the amount of thickening agent employed is about 0.1% to about 2.0% by weight, and preferably, from about 0.15% to about 0.5% by weight thickening agent based on total weight of the heterogeneous edible spread, including all ranges subsumed therein. In a most preferred embodiment, the thickening agent employed in this invention is an alginate, such as sodium alginate, and the amount of alginate used in the aqueous phase is enough to give the aqueous phase a viscosity that is higher than the viscosity of the fat phase at about 50° C. to about 60° C.

Chelators which may be added to the aqueous phase that is used to make the water-in-oil composition of this invention are limited only to the extent that they may be used in heterogeneous edible spreads. An illustrative list of chelators that may be used in this invention include phosphates, citrates, acids, like gluconic acid and ethylenediaminetetraacetic acid (EDTA). The preferred chelating agent is EDTA.

When a chelator is used in the aqueous phase of this invention, it typically makes up about 0.001% to about 0.5%, and preferably, from about 0.002% to about 0.1%, and most preferably, from about 0.005% to about 0.01% by weight of the total heterogeneous edible spread, including all ranges subsumed therein.

Other ingredients which may be added to the aqueous phase that is combined with the fat phase to produce the heterogeneous edible spread comprising a water soluble humectant of this invention include pH modifiers, like lactic acid and preservatives such as potassium or sodium sorbate, benzoic acid, acetic acid and phosphoric acid. Typically, the pH modifiers make up less than about 0.1% of the total weight of the heterogeneous edible spread, and the preservatives typically make up less than about 0.2% of the total weight of the heterogeneous edible spread of this invention.

In a preferred embodiment, the aqueous phase of this invention comprises a fruit puree such as an apple, blueberry or strawberry puree. The fruit puree which may be used in this invention typically comprises fruit, sugar, a preservative and food coloring and it is commercially available from suppliers like the J. M. Smucker Company. Typically, the amount of fruit puree added to the aqueous phase is from about 0.0% to about 20%, and preferably, from about 1.0% to about 15%, and most preferably, from about 3.0% to about 8.0% by weight of the total weight of the heterogeneous edible spread.

It is especially noted herein that there is generally no limitation with respect to the type or amount of fruit puree used in this invention (as long as a heterogeneous edible spread can be made), however, the sugar in the fruit puree should be considered as water soluble humectant when calculating the amount of water soluble humectant in the water-in-oil composition used to make the heterogeneous spread of this invention.

Emulsifiers which may be used to prepare the heterogeneous edible spreads of this invention may be added to the fat phase, aqueous phase or both phases. There generally is no limitation with respect to the types of emulsifiers which may be used in this invention other than that the emulsifiers can be used to make a heterogeneous edible spread.

An illustrative list of the emulsifiers which may be used to make the heterogeneous edible spreads of this invention include mono- and diglycerides, partial polyglycerol esters, lecithin, polyoxyethylene sorbitan monoesters and polyglycerol polyricinoleates. Generally, the amount of emulsifier used to prepare the heterogeneous edible spread of this invention is less than about 1.5% by weight based on total weight of the heterogeneous edible spread.

The preferred emulsifier which may be used in this invention is a mixture consisting of monoglycerides (iodine value of 60) and polyglycerol esters of fatty acids (HLB 6.5). The former is sold under the name of Dimodan OK and made commercially available from Danisco. The latter is sold under the name of Santone 3-1-SH and commercially available from Loders Croklaan. In a most preferred embodiment, the emulsifier is added to the fat phase prior to making the water-in-oil composition comprising the water soluble humectant. The preferred amount of emulsifier used is from about 0.2% to about 1.2%, and most preferably, from about 0.3% to about 0.7% by weight, based on total weight of the heterogeneous edible spread, including all ranges subsumed therein. Moreover, when monoglycerides and polyglycerol esters of fatty acids are used as the emulsifiers, the former typically makes up from about 1.0% to about 50%, and preferably, from about 5.0% to about 30%, and most preferably, from about 15% to about 25% by weight of the total weight of the mixture of emulsifiers, including all ranges subsumed therein.

Other examples of the types of additives which may be used in the fat phase and/or aqueous phase of this invention include coloring agents like beta carotene, paprika, turmeric and annato; and antioxidants like normal propyl gallate, tocopherols like vitamin E, butylated hydroxyamisole and citric acid. Still further, additional examples of the types of additives which may be employed in the heterogeneous edible spread of this invention are disclosed in U.S. Pat. No. 5,837,307, the disclosure of which is incorporated herein by reference.

When preparing the fat phase and the aqueous phase that are used to make the water-in-oil composition comprising the water soluble humectant, the contents of the fat phase are mixed, and the contents of the aqueous phase are mixed. An emulsion is then made by combining the fat phase and the aqueous phase. When making the emulsion, the fat phase and aqueous phase are mixed, stirred or agitated using any art recognized technique. The emulsion may be made at ambient temperature, atmospheric pressure or any pressure or temperature variations which will result in an emulsion.

The varigate composition having the water soluble humectant which may be employed in this invention is limited only to the extent that it can be used to make a heterogeneous edible spread. The varigate composition typically comprises fruit (e.g., strawberry, apples, blueberries); sugar; water; pectin; calcium chloride, artificial or natural flavors or both; thickeners, like xantham, locust bean gum, guar gum and mixtures thereof; food coloring (e.g., red 40 for strawberry varigates) and preservatives like potassium sorbate. The varigate composition is commercially available from suppliers like J. M. Smucker Company. The varigate composition is typically formulated according to taste, and preferably, has a preservative concentration that is substantially the same as the preservative concentration in the water-in-oil composition comprising the water soluble humectant. Most preferably, however, the varigate composition has a water activity that is substantially the same as the water activity of the water-in-oil composition. Thus, substantially the same water activity is observed in the two phases of the resulting heterogeneous edible spread.

When making the heterogeneous edible spread of this invention, for example, the emulsion (comprising the fat phase and aqueous phase) is fed into a run tank where it is stored and maintained at a temperature of about 50° C. to about 60° C. Prior to entering a scrape surface heat exchanger (A1-unit), a gas may optionally be fed into the emulsion in order to aerate the emulsion prior to any crystallization of the fat phase. Such gases include nitrogen, carbon dioxide and mixtures thereof. The amount of gas which may be fed into the emulsion is only limited to the extent that the desired water-in-oil composition produced therefrom can be used in a heterogeneous edible spread. Typically, about 5% to about 35%, and preferably, from about 10% to about 30%, and most preferably, from about 15% to about 25% of the emulsion is gas, based on total volume of the emulsion with gas, including all ranges subsumed therein.

Within the A-unit, the emulsion is mixed and cooled to start the crystallization of the fat source (e.g., triglycerides) in the emulsion. The A-unit is typically maintained at a temperature from about 1° C. to about 30° C., and preferably, from about 1.5° C. to about 20° C., and most preferably, from about 2° C. to about 10° C.

The emulsion, which has begun to crystallize, is then fed to a slowly turning pin mixer (C-unit). Within the pinmixer, sheer is applied (about 100–900 RPM) for the phases of the partially crystallized emulsion to disperse. From the C-unit, the partially crystallized emulsion is fed into a second scrape surface heat exchanger (A2-unit) which further chills and the partially crystallized emulsion to produce the desired water-in-oil composition.

Depending on the form of the desired heterogeneous edible spread (e.g., tub, stick), an additional cooling unit may be used (B-unit) so that the hardness of the water-in-oil composition can be varied.

It is noted herein that when producing the water-in-oil composition, an inversion of the emulsion may or may not be required. Thus, if enough water is present in the system (e.g., about 70%), the initial emulsion fed in to the A1-unit will be an oil-in-water emulsion that is subsequently inverted by conventional techniques in either the C-unit. A more detailed description of the process for making the water-in-oil compositions is disclosed in U.S. Pat. Nos. 4,103,037, 4,917,915, 5,169,668 and 5,837,307, the disclosures of which are incorporated herein by reference. In this invention, the water-in-oil composition is preferably from about 15.0% to about 75%, and preferably, from about 20% to about 50%, and most preferably, from about 35% to about 45% fat or oil (e.g., triglyceride or substitute thereof) based on total weight of the water-in-oil composition, including all ranges subsumed therein.

When the water-in-oil composition used in this invention is prepared, the aqueous phase in the water-in-oil composition is in the form of droplets having a size distribution (d3.3) of less than about 30 microns, and preferably, less than about 10 microns. As used herein, d3.3 is defined as the mean volume of the droplet size distribution as determined by NMR spectroscopy. A more detailed description for determining droplet size may be found in U.S. Pat. No. 5,302,408 and *Colloid and Interface Science*, by J. C. van Enden et al, 140 (1990) pp. 105–113, the disclosures of which is incorporated herein by reference.

Furthermore, the actual solid fat content of the water-in-oil composition used in this invention may be expressed in terms of N-values as described in Fette, Seifein, Anstrichmitel, Vol. 80, pp. 180–186 (1978), the disclosure of which is incorporated herein by reference. The N-values for the water-in-oil composition in this invention are:

$N_{10}$=about 7 to about 50;

$N_{20}$=about 5 to about 40;

$N_{30}$=about 1 to about 30; and $N_{35}$=about 0 to about 5.

When the water-in-oil composition of this invention is discharged from the A2-unit, the varigate composition comprising the water soluble humectant is pumped into the water-in-oil composition, preferably immediately before packaging. The amount of water-in-oil composition and varigate composition in the final heterogeneous edible spread is limited only to the extent that a spread, desirable for consumer consumption, is made. Typically, the final product (heterogeneous edible spread) has about 5% to about 30%, and preferably, from about 10% to about 25% and most preferably, from about 15% to about 20% by weight varigate composition based on total weight of the heterogeneous edible spread, including all ranges subsumed therein.

When the varigate composition is pumped into the water-in-oil composition, it may be done so in the form of, for example, drops, zigzags, streams, veins, swirls or ribbons. Preferably, the varigate composition is pumped into the water-in-oil composition in the form of swirls.

The example below is provided to illustrate and facilitate an understanding of the following invention. The example is not intended to restrict the scope of the invention.

EXAMPLE

A vessel was charged with the following items:

| | % Weight based on total weight of the heterogeneous edible spread |
|---|---|
| Partially hydrogenated bean oil (m.p. 42° C.) | 8.7 |
| Liquid Bean Oil | 30.7 |
| Distilled monoglyceride (iodine value 60) | 0.4 |
| Polyglycerol esters of fatty acid (HLB 6.5) | 0.1 |
| Soy lecithin | 0.1 |

The items were mixed in the vessel and heated to about 60° C. The resulting product was a homogeneous solution that was used as the fat phase to produce the water-in-oil composition comprising the water soluble humectant of this invention.

A second vessel was charged with the following items:

| | % Weight based on total weight of the heterogeneous edible spread |
|---|---|
| Water | 24.6 |
| Salt | 1.0 |
| Yogurt powder | 1.035 |
| Sodium alginate | 0.3 |
| EDTA | 0.008 |
| Potassium sorbate | 0.112 |
| High fructose corn syrup (71% solids/42% fructose) | 26.5 |
| Lactic acid | 0.1 |
| Seedless strawberry puree | 6.3 |

The items were mixed in the second vessel and heated to about 35° C. The resulting product was a homogeneous solution that was used as the aqueous phase to produce the water-in-oil composition comprising the water soluble humectant of this invention.

A run tank was charged with the fat phase to which the aqueous phase was added. The contents were stirred and heated to about 55° C. for about 1 hour to produce a water-in-oil emulsion.

Trace amounts of Vitamin A, and butter strawberry flavoring were added to the emulsion. Nitrogen (20%) was injected into the emulsion and the resulting aerated emulsion was passed through an A-unit exiting at about 5° C. The resulting cooled emulsion was then passed through a C-unit (30 liters) having a shaft speed of about 400 RPM. The resulting crystallized emulsion was subsequently passed through a second A-unit at about 5° C. The resulting water-in-oil spread had a fat content of about 39.5%.

A varigate composition with water soluble humectant (strawberry) was purchased as made commercial available from J. M. Smuckers. The humectant concentration of the varigate composition was modified by blending in, with a commercially available blender, sugar (end product had a water activity of 0.9 and a viscosity that was substantially similar to the viscosity of the water-in-oil composition). The amount of sugar blended into the varigate composition was enough to give the varigate composition substantially the same water activity as the water-in-oil composition.

Once the water soluble humectant concentration of the varigate composition was adjusted, streams of the water-in-oil composition (at about 5° C. to about 10° C.) were joined with streams of the varigate composition to produce the heterogeneous edible spread having about 15% by weight varigate composition.

Approximately 50–8 oz. containers were filled with heterogeneous edible spread comprising about 15% varigate composition. The containers were stored in a manner that mimicked consumer use. For example, the containers were stored at about 5° C. During periodic time frames, the temperature of the containers was raised to about 20° C. for about 1 hour (about the time the product would be on the consumers table). After about 10 days of observation (about the time it takes for the consumer to use the product). The appearance and texture of the spread remained substantially the same as when the heterogeneous edible spread was first made (as determined by visual inspection).

What is claimed is:

1. A heterogeneous edible spread comprising:
   (a) a water-in-oil composition comprising a water soluble humectant; and
   (b) a variegate composition comprising a water soluble humectant wherein the water-in-oil composition is prepared from a fat phase and an aqueous phase, the fat phase and the aqueous phase have a viscosity and the viscosity of the aqueous phase is greater than the viscosity of the fat phase at a temperature range from about 50° C. to about 60° C., and the water-in-oil composition and the variegate composition comprise substantially the same water activity.

2. The heterogeneous edible spread in accordance with claim 1 further comprising a preservative concentration wherein the water-in-oil composition and the varigate composition have substantially the same preservative concentration.

3. The heterogeneous edible spread in accordance with claim 2 wherein the heterogeneous edible spread comprises potassium sorbate or benzoic acid as a preservative.

4. The heterogeneous edible spread in accordance with claim 1 wherein the heterogeneous edible spread further comprises an emulsifier composition comprising at least one member selected from the group consisting of a monoglyceride, a diglyceride, and, a polyglycerol ester of a fatty acid.

5. The heterogeneous edible spread in accordance with claim 4 wherein the emulsifier composition makes up from about 0.2% to about 1.5% by weight of the total weight of the heterogeneous edible spread.

6. The heterogeneous edible spread in accordance with claim 4 wherein the emulsifier composition comprises a monoglyceride and a polyglycerol ester of a fatty acid wherein the monoglyceride makes up from about 1.0% to about 50% by weight of the total weight of the emulsifier composition.

7. The heterogeneous edible spread in accordance with claim 4 wherein the emulsifier composition is a precursor for an emulsion having from about 5% to about 35% gas based on total weight of the emulsifier.

8. The heterogeneous edible spread in accordance with claim 7 wherein the gas is nitrogen, carbon dioxide or a mixture thereof.

9. The heterogeneous edible spread in accordance with claim 1 wherein the water-in-oil composition and the varigate composition each comprise a substantially similar flavor.

10. The heterogeneous edible spread in accordance with claim 1 wherein, the water-in-oil composition and the varigate composition each comprise a substantially different flavor.

11. The heterogeneous edible spread in accordance with claim 1 wherein the water-in-oil composition is prepared from a fat phase comprising a triglyceride and an aqueous phase comprising a water soluble humectant.

12. The heterogeneous edible spread in accordance with claim 11 wherein the fat phase comprises a triglyceride comprising a partially hydrogenated oil that melts at about 25° C. to about 50° C. and a liquid oil that is a liquid at ambient temperature.

13. The heterogeneous edible spread in accordance with claim 11 wherein the water-in-oil composition has a $N_{10}$ value from about 7 to about 50.

14. The heterogeneous edible spread in accordance with claim 11 wherein the aqueous phase further comprises a colorant, vitamin, antioxidant, antimicrobial, protein source, thickening agent, chelating agent, preservative, pH buffer or fruit puree.

15. The heterogeneous edible spread in accordance with claim 11 wherein the humectant is salt, sugar, sorbital, glycerol or a mixture thereof.

16. The heterogeneous edible spread in accordance with claim 15 wherein the humectant is salt and makes up from about 0.25% to about 4.0% by weight of the total weight of the heterogeneous edible spread.

17. The heterogeneous edible spread in accordance with claim 15 wherein the humectant is sugar.

18. The heterogeneous edible spread in accordance with claim 17 wherein the sugar is from corn syrup.

19. The heterogeneous edible spread in accordance with claim 14 wherein the aqueous phase further comprises a protein source which is whole milk, semi-skimmed milk, skimmed milk, cultured butter milk, butter milk powder, skimmed milk powder, yogurt, yogurt powder, quark, cottage cheese, whey powder, butter, soy protein, rice protein, or mixture thereof.

20. The heterogeneous edible spread in accordance with claim 14 wherein the aqueous phase further comprises a thickening agent which is an alginate.

21. The heterogeneous edible spread in accordance with claim 20 wherein the thickening agent is present in an amount from about 0.1% to about 2.0% by weight, based on total weight of the heterogeneous edible spread.

22. The heterogeneous edible spread in accordance with claim 11 wherein the aqueous phase and fat phase have a viscosity, and the viscosity of the aqueous phase is greater than the viscosity of the fat phase at a temperature range of about 50° C. to about 60° C.

23. The heterogeneous edible spread in accordance with claim 1 wherein the varigate composition comprises fruit.

24. The heterogeneous edible spread in accordance with claim 23 wherein the fruit is strawberry, apple or blueberry.

25. The heterogeneous edible spread in accordance with claim 1 wherein the varigate composition is pumped into the water-in-oil composition in the form of drops, zigzags, streams, veins, swirls or ribbons.

26. The heterogeneous edible spread in accordance with claim 1 wherein the heterogeneous edible spread comprises about 1.0% to about 75% by weight triglyceride.

27. A heterogeneous edible spread comprising:
   a) a water-in-oil composition comprising a water soluble humectant;
   b) a variegate composition comprising a water soluble humectant; and
   c) an emulsifier composition comprising at least one member selected from the group consisting of a monoglyceride and a diglyceride, and with or without, a polyglycerol of a fatty acid wherein
      i) the water-in-oil composition and the variegate composition have substantially the same water activity;
      ii) the water-in-oil composition each independently comprise a substantially similar flavor or a substantially different flavor;
      iii) the water-in-oil composition and the variegate composition have substantially the same preservative composition, and wherein the water-in-oil composition is prepared from a fat phase and an aqueous chase, the fat phase and the aqueous phase have a viscosity and the viscosity of the aqueous phase is greater than the viscosity of the fat phase at a temperature range from about 50° C. to about 60° C.

28. A food product comprising the heterogeneous edible spread of claim 27.

29. A heterogeneous edible spread comprising:
   (a) a water-in-oil composition comprising a water soluble humectant; and
   (b) a variegate composition comprising a water soluble humectant wherein the water-in-oil composition is prepared from a fat phase and an aqueous phase and the water-in-oil composition and the variegate composition comprise fruit, and the water-in-oil composition and the variegate composition comprise substantially the same water activity.

30. A heterogeneous edible spread according to claim 29 wherein the water-in-oil composition and the variegate comprise a flavor from an identical fruit.

* * * * *